US012374477B2

(12) United States Patent
Ootsuki

(10) Patent No.: US 12,374,477 B2
(45) Date of Patent: Jul. 29, 2025

(54) FERRITE SINTERED MAGNET, AND METHOD OF MANUFACTURING FERRITE SINTERED MAGNET

(71) Applicant: TDK Corporation, Tokyo (JP)

(72) Inventor: Shirou Ootsuki, Tokyo (JP)

(73) Assignee: TDK Corporation, Tokyo (JP)

( * ) Notice: Subject to any disclaimer, the term of this patent is extended or adjusted under 35 U.S.C. 154(b) by 612 days.

(21) Appl. No.: 17/687,209

(22) Filed: Mar. 4, 2022

(65) Prior Publication Data

US 2022/0285058 A1 Sep. 8, 2022

(30) Foreign Application Priority Data

Mar. 8, 2021 (JP) ................................. 2021-036103

(51) Int. Cl.
*H01F 1/055* (2006.01)
*B22F 9/04* (2006.01)

(52) U.S. Cl.
CPC .................................. *H01F 1/0557* (2013.01)

(58) Field of Classification Search
None
See application file for complete search history.

(56) References Cited

U.S. PATENT DOCUMENTS

| | | | |
|---|---|---|---|
| 6,248,253 B1 | 6/2001 | Taguchi et al. | |
| 6,737,011 B1 | 5/2004 | Takami et al. | |
| 2003/0168785 A1 | 9/2003 | Takami et al. | |
| 2005/0098761 A1 | 5/2005 | Takami et al. | |
| 2012/0105185 A1 | 5/2012 | Oda et al. | |
| 2013/0285779 A1* | 10/2013 | Kobayashi | C04B 35/6262 264/611 |
| 2015/0221424 A1 | 8/2015 | Kobayashi et al. | |
| 2015/0332819 A1 | 11/2015 | Oda et al. | |
| 2019/0304643 A1 | 10/2019 | Morita et al. | |

FOREIGN PATENT DOCUMENTS

| | | |
|---|---|---|
| CN | 1530971 A | 9/2004 |
| CN | 110323025 A | 10/2019 |
| JP | 2000-156310 A | 6/2000 |
| JP | 2001-057305 A | 2/2001 |
| JP | 2002-118012 A | 4/2002 |
| KR | 2012-0047245 A | 5/2012 |

OTHER PUBLICATIONS

Indian Office Action issued Jan. 19, 2024 in Application No. 202244012064.

* cited by examiner

*Primary Examiner* — Xiaowei Su
(74) *Attorney, Agent, or Firm* — Faegre Drinker Biddle & Reath LLP

(57) ABSTRACT

Provided is a ferrite magnet including: magnetoplumbite type ferrite crystal grains; and a grain boundary phase interposed between the ferrite crystal grains. The ferrite crystal grains and the grain boundary phase respectively contain a metal element A, La, Co, and Fe, the metal element A is at least one kind of element selected from the group consisting of Sr, Ba, and Ca, and when an atomic ratio of Co to La in the ferrite crystal grains is set as $R_{FG}$, and an atomic ratio of Co to La in the grain boundary phase is set as $R_{GB}$, the following expression is satisfied.

$$0.5 \le R_{GB}/R_{FG} \le 0.9$$

3 Claims, 1 Drawing Sheet

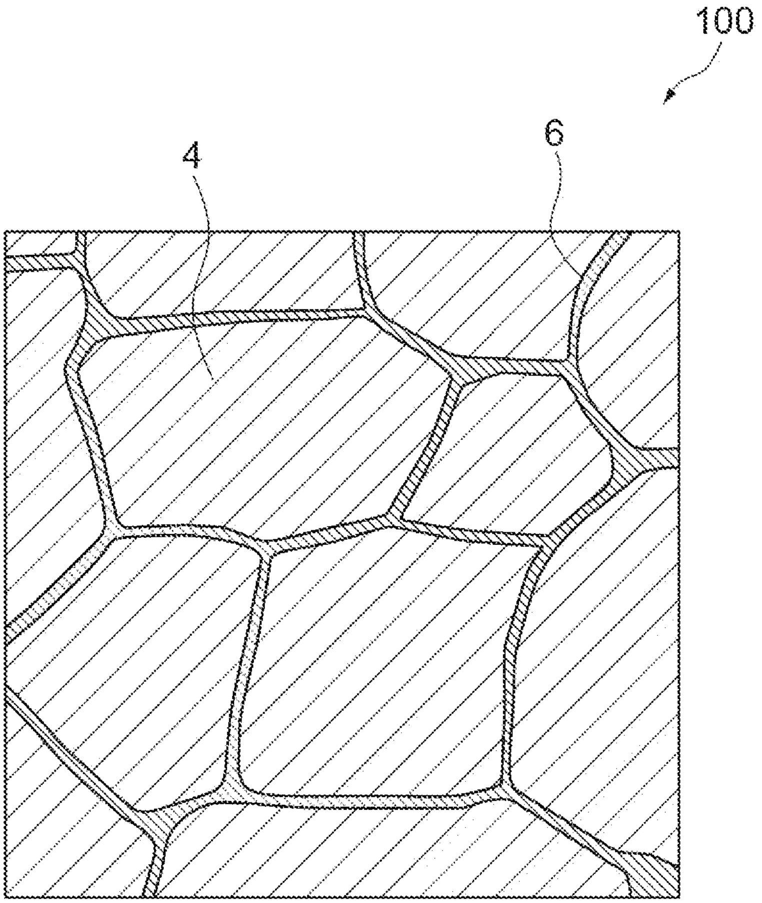
100
4
6

FERRITE SINTERED MAGNET, AND METHOD OF MANUFACTURING FERRITE SINTERED MAGNET

TECHNICAL FIELD

The present disclosure relates to a ferrite sintered magnet, and a method of manufacturing the same.

BACKGROUND

As a magnetic material that is used in a ferrite sintered magnet, Ba ferrite, Sr ferrite, and Ca ferrite which have a hexagonal crystal structure are known (for example, Patent Literature 1 to 3). As a crystal structure of the ferrite, a magnetoplumbite type (M type), a W type, and the like are known. Among these, as a magnet material for motors and the like, mainly, magnetoplumbite type (M type) ferrite is employed. The M type ferrite is typically expressed by a general formula of $AFe_{12}O_{19}$.

CITATION LIST

Patent Literature

Patent Literature 1: JP2000-156310A
Patent Literature 2: JP2001-57305A
Patent Literature 3: JP2002-118012A

SUMMARY

In a process of manufacturing a ferrite sintered magnet, after sintering, the ferrite sintered magnet is cut in order to obtain a desired shape in many cases.

However, in the ferrite sintered magnet of the related art, it is difficult to raise a cutting speed so much, and it is difficult to improve productivity.

The invention has been made in consideration of such circumstances, and an object thereof is to provide a ferrite sintered magnet capable of raising a cutting speed, and a method of manufacturing the same.

According to an aspect of the invention, there is provided a ferrite sintered magnet including: magnetoplumbite type ferrite crystal grains; and a grain boundary phase interposed between the ferrite crystal grains.

The ferrite crystal grains and the grain boundary phase respectively contain a metal element A, La, Co, and Fe, the metal element A is at least one kind of element selected from the group consisting of Sr, Ba, and Ca. When an atomic ratio of Co to La in the ferrite crystal grains is set as $R_{FG}$, and an atomic ratio of Co to La in the grain boundary phase is set as $R_{GB}$, the ferrite sintered magnet satisfies the following expression.

$$0.5 \le R_{GB}/R_{FG} \le 0.9$$

When an atomic ratio of Co in all metal atoms of the ferrite crystal grains is set as $C_{Co,\ FG}$, and an atomic ratio of Co in all metal atoms of the grain boundary phase is set as $C_{Co,\ GB}$, the ferrite sintered magnet may satisfy the following expression.

$$C_{Co,GB}/C_{Co,FG} < 1$$

According to another aspect of the invention, there is provided a method of manufacturing a ferrite sintered magnet including:

calcining a raw material powder to obtain a calcined body containing magnetoplumbite type ferrite crystal grains;

pulverizing the calcined body to obtain a ferrite powder;

mixing an additive powder with the ferrite powder to obtain a mixed powder;

molding the mixed powder to obtain a molded body; and firing the molded body.

The raw material powder contains a metal element A, La, Co, and Fe, the additive powder contains La and Co, but does not contain Fe, the metal element A is at least one kind of element selected from the group consisting of Sr, Ba, and Ca, and an atomic ratio of Co to La in the additive powder is 40% to 80% with respect to an atomic ratio of Co to La in the raw material powder.

In the method, the additive powder may further contain the metal element A, and an atomic ratio of the metal element A to La in the additive powder is 80% to 120% with respect to an atomic ratio of the metal element A to La in the raw material powder.

According to the invention, a ferrite sintered magnet capable of raising a cutting speed, and a method of manufacturing the same are provided.

BRIEF DESCRIPTION OF THE DRAWINGS

FIG. 1 is a schematic cross-sectional view of a ferrite sintered magnet.

DETAILED DESCRIPTION

Several embodiments of the invention will be described below in detail.

A ferrite sintered magnet according to an embodiment is a ferrite sintered magnet including magnetoplumbite type (M type) ferrite crystal grains, and a grain boundary phase interposed between the ferrite crystal grains.

(Sintered Magnet)

FIG. 1 is a schematic cross-sectional view of a ferrite sintered magnet 100 according to an embodiment of the invention. As illustrated in FIG. 1, the ferrite sintered magnet 100 according to this embodiment includes magnetoplumbite type (M type) ferrite crystal grains 4, and a grain boundary phase 6 existing between the ferrite crystal grains 4.

(Ferrite Crystal Grain)

The ferrite crystal grains 4 contain at least a metal element A, La, Co, Fe, and an oxygen atom.

The metal element A is an at least one kind of element selected from the group consisting of Sr, Ba, and Ca.

An atomic ratio of each atom in the metal element A is not limited, and only one kind may be contained or two or more kinds may be contained. The ferrite crystal grains may contain 1.2 to 3.2 at % of Ca in all metal atoms.

The ferrite crystal grains 4 may contain 4.0 to 6.5 at % of La in all metal atoms.

The ferrite crystal grains 4 may contain at least one kind of metal atom R selected from the group consisting of Bi and rare earth elements including Y, addition to La.

Examples of the rare earth element in addition to La include Y, Se, Ce, Pr, Nd, Pm, Sm, Eu, Gd, Tb, Dy, Ho, Er, Tm, Yb, and Lu.

From the viewpoint of enhancing magnetic characteristics, an atomic concentration $C_{Co,\ FG}$ of Co in all metal atoms of the ferrite crystal grains 4 is preferably set to 2.0 to 3.7 at %.

The ferrite crystal grains 4 may contain at least one kind of metal atom M selected from the group consisting of Mn, Mg, Ni, Cu, and Zn ire addition to Co.

With respect to all metal atoms of the ferrite crystal grains 4, a ratio of the metal element A can be set to 1 to 13 at %, a total ratio of La and the metal element R can be set to 0.05 to 10 at %, a ratio of Fe can be set to 80 to 95 at %, and a total ratio of Co and the metal element M can be set to 0.1 to 5 at %.

An atomic ratio $R_{FG}$ of Co to La in the ferrite crystal grains 4 can be 0.3 to 1.0.

The ferrite crystal grains 4 have a magnetoplumbite type crystal structure belonging to a hexagonal system. Ferrite having the magnetoplumbite type crystal structure can be expressed by the following Formula (III).

$$QX_{12}O_{19} \quad \text{(III)}$$

Here, the metal element A and a part of La and the metal element R enter a Q (A site).

Fe, a metal element M, and the remaining La and metal element R enter X (B site).

Note that, in Formula (III), since an atomic ratio of (A site) and X (B site) to O exhibits a value slightly deviating from the above-described range in fact, the atomic ratio may deviate from the above-described numerical value, for example, by approximately 10%.

From the viewpoint of sufficiently enhancing magnetic characteristics, the ferrite sintered magnet preferably includes the ferrite crystal grains 4 as a main phase. Note that, in this specification, description of "as a main phase" represents a crystal phase of which a mass ratio is the greatest in the ferrite sintered magnet. The ferrite sintered magnet may include crystal grains (different phase) different from the ferrite crystal grains (main phase) 4, a ratio of the ferrite crystal grains (main phase) 4 may be 70% by mass or greater, 80% by mass or greater, 90% by mass or greater, or 95% by mass or greater.

For example, an average grain size of ferrite crystal grains in the ferrite sintered magnet may be 5 μm or less, 4.0 arm or less, or 0.5 to 3.0 μm. When having the average grain size, a coercive force can be enhanced. The average grain size of the ferrite crystal grains can be obtained by using an observation image of a cross-section with a TEM or a SEM. Specifically, after obtaining cross-sectional areas of crystal grains in across-section of the SEM or the TEM which includes several hundreds of ferrite crystal grains by image analysis, a diameter of a circle having the cross-sectional area (equivalent circle diameter) is defined as a grain size of the crystal grains on the cross-section, and a grain size distribution is measured. From the measured number-basis grain size distribution, a number-basis average value of the grain size of the ferrite crystal grains is calculated. The average value measured in this manner is set as an average grain size of the ferrite crystal grains.

(Grain Boundary Phase)

The grain boundary phase 6 includes an oxide as a main component, Specifically, the oxide contains the metal element A, La, Co, and Fe. A mass ratio of the oxide in the grain boundary phase 6 may be 90% or greater, 95% or greater, or 97% or greater.

An atomic ratio of the metal element A in all metal atoms of the grain boundary phase 6 is not limited, and it is not necessary to be the same as in the ferrite crystal grains. The atomic ratio of the metal element A in all metal atoms in the grain boundary phase 6 may be greater than an atomic ratio of the metal element A in all metal elements in the ferrite crystal grains 4, The grain boundary phase 6 may contains 2 at % or greater of Ca in all metal atoms.

The grain boundary phase 6 can contain 0.1 to 15 at % of La in all metal atoms.

An atomic ratio of La in all metal atoms of the grain boundary phase 6 may be greater than an atomic ratio of La in all metal atoms of the ferrite crystal grains 4. The grain boundary phase 6 may contain at least one kind of metal element R selected from the group consisting of Bi and rare earth elements including Y, in addition to La.

An atomic ratio of Co in all metal atoms of the grain boundary phase 6 may be less than an atomic ratio of Co in all metal atoms of the ferrite crystal grains. An atomic concentration $C_{Co,\ GB}$ of Co in all metal atoms of the grain boundary phase 6 can be set to 0.05 to 3.5 at %.

The ferrite crystal grains 4 may contain at least one kind of metal element M selected from the group consisting of Mn, Mg, Ni, Cu, and Zn in addition to Co.

With respect to an atomic number of all metal elements of the grain boundary phase 6, a ratio of the metal element A can be set to 1 to 14 at %, a ratio of La and the metal element R can be set to 1 to 11 at %, a ratio of Fe can be set to 78 to 95 at %, and a ratio of Co and the metal element M can be set to 0.05 to 4.5 at %.

An atomic ratio $R_{OB}$ of Co to La in the grain boundary phase 6 can be 0.1 to 0.8.

When an atomic ratio of Co to La in the ferrite crystal grains 4 is set as $R_{FG}$, and an atomic ratio of Co to La in the grain boundary phase 6 is set as $R_{GB}$, the sintered magnet of this embodiment satisfies the following expression.

$$0.5 \le R_{GB}/R_{FG} \le 0.9$$

When an atomic ratio of Co in all metal atoms of the ferrite crystal grains is set as $C_{Co,\ FG}$, and an atomic ratio of Co in all metal atoms in the grain boundary phase is set as $C_{Co,\ GB}$, the sintered magnet of this embodiment can satisfy the following expression. When the ratio is large, a different phase tends to occur.

$$C_{Co,GB}/C_{Co,FG} < 1$$

It is preferable that the sintered magnet of this embodiment further satisfies the following expression. When this ratio is small, processability tends to deteriorate.

$$1.5C_{Co,GB}/C_{Co,FG} \le 0.8$$

In a cross-section of the ferrite sintered magnet, an area ratio of the grain boundary phase 6 in the entirety of the ferrite crystal grains 4 and the grain boundary phase 6 can be set to 0.01% to 5%.

A shape of the ferrite sintered magnet is not particularly limited, and for example, various shapes such as an arc segment shape (C shape) in which a cross-section is curved to an arc shape, and a flat plate shape can be employed.

The ferrite crystal grains and/or grain boundary phase of the ferrite sintered magnet according to the embodiment of the invention may contain metalloid atoms such as Si and B, and metal atoms such as Ga, Sn, In, Ti, Cr, Mo, V, Cu, Ge, Zr, and Al in addition to the above-described elements. The content of the metalloid atoms is preferably set to 1.5% by mass or less in a total amount in terms of oxides, and the content of other metal atoms is preferably set to 6.0% by mass or less in a total amount in terms of oxides.

A content ratio of metal elements in the ferrite crystal grains and the grain boundary phase can be measured by STEM-EDX, and a content ratio of metal elements of the entirety of sintered magnet can be measured by fluorescent X-ray (XRF) analysis, inductively coupled plasma (ICP) emission spectrometry (ICP emission spectrometry).

As an example of a composition of the entirety of the magnet, with respect to the amount of all metal elements, A is 1 to 13 at %, La is 0.05 to 10 at %, the sum of La and the metal element R is 0.05 to 11 at %, Fe is 80 to 95 at %, Co is 0.1 to 5 at %, and the sum of Co and the metal element M is 0.1 to 6 at %.

(Effect)

According to the ferrite sintered magnet according to this embodiment, a cutting speed of the ferrite sintered magnet can be raised. The reason for this is not clear, but it is considered that since an atomic ratio of Co/La in the grain boundary phase is smaller than an atomic ratio of Co/La in the ferrite crystal grains in a predetermined range, defects derived from a charge imbalance in the grain boundary phase increases.

The ferrite sintered magnet according to this embodiment can be used as a rotary electric machine such as a motor and a generator, a magnet for speakers and headphones, a magnetron tube, a magnetic field generator for MRI, a clamper for CD-ROMs, a sensor for distributors, a sensor for ABS, a fuel and oil level sensor, a magnet latch, or a magnetic field generating member such as an isolator. In addition, the ferrite sintered magnet can also be used as a target (pellet) when forming a magnetic layer of a magnetic recording medium by a vapor deposition method, a sputtering method, or the like.

(Method of Manufacturing Ferrite Sintered Magnet)

Next, an example of a method of manufacturing the ferrite sintered magnet will be described. The following manufacturing method includes a blending process, a calcination process, a pulverization process, an additive powder mixing process, a molding process, and a firing process. Details of the processes will be described below.

(Blending Process)

The blending process is a process of preparing a raw material powder for calcination. The raw material powder for calcination contains constituent elements of ferrite, That is, the raw material powder contains the metal element A, the metal element R including La, the metal element M including Co, and Fe. In the blending process, a mixture of powders containing respective elements is preferably mixed for approximately 1 to 20 hours with attritor, a ball mill, or the like, and further pulverized to obtain the raw material powder.

Examples of the powders containing respective elements include elementary substances of respective elements, oxides, hydroxides, carbonates, nitrates, silicates, and organic metal compounds. One powder may contain two or more metal elements, or one powder may substantially contain only one metal element.

Examples of a powder containing Ca include $CaCO_3$. Examples of powder containing Sr include $SrCO_3$. Examples of a powder containing Ba include $BaCO_3$. Examples of a powder containing La include $La_2O_3$ and $La(OH)_3$. Examples of a powder containing Fe include $Fe_2O_3$. Examples of a powder containing Co include $Co_3O_4$.

A ratio of each metal element in the raw material powder can be appropriately set in conformity to a composition of the ferrite crystal grains.

An average particle size of the raw material powder is not particularly limited, and the average particle size is, for example, 0.1 to 2.0 μm.

After the blending process, it is preferable to dry the raw material composition and to remove coarse particles with a sieve as necessary.

(Calcination Process)

In a calcination process, the raw material powder obtained in the blending process is calcined to obtain a calcined body. For example, calcination is preferably performed in oxidizing atmosphere such as the air. For example, a calcination temperature may be 1100° C. to 1400° C., or 1100° C. to 1350° C. For example, calcination time may be one minute to ten hours, or one minute to three hours. For example, a ratio of the ferrite phase (M phase) in the calcined body that is obtained by calcination and contains ferrite crystal grains may be 70% by mass or greater, or 75% by mass or greater. The ratio of the ferrite phase can be obtained in a similar manner as in the ratio of the ferrite phase in the ferrite sintered magnet.

(Pulverization Process)

In a pulverization process, the calcined body that granulated or agglomerated by the calcination process is pulverized to obtain a ferrite powder. For example, the pulverization process may be performed in a two-step process of pulverizing the calcined powder into a coarse powder (a coarse pulverization process) and of further finely pulverizing the coarse powder (a fine pulverization process).

For example, the coarse pulverization can be performed by using a vibration mill until an average particle size of the calcined body becomes 0.1 to 5.0 μm.

In the fine pulverization, the coarse powder obtained in the coarse pulverization is pulverized by a wet attritor, a ball mill, a jet mill, or the like. In the fine pulverization, pulverization can be performed so that an average particle size of obtained particles becomes, for example, approximately 0.08 to 2.0 μm. A specific surface area (obtained, for example, by a BET method) of the fine powder may be set to, for example, approximately 7 to 12 $m^2/g$. Appropriate pulverization time is different depending on a pulverization method. For example, in the case of a wet attritor, the pulverization time is 30 minutes to 10 hours, and in the case of wet pulverization by the ball mill, the pulverization time is 10 to 50 hours. The specific surface area of the obtained powder can be measured by a commercially available BET specific surface measuring device (product name: UM Model-1210, manufactured by MOUNTECH Co., Ltd.).

In the fine pulverization process, for example, polyhydric alcohol expressed by a general formula $C_n(OH)_nH_{n+2}$ can be added to raise the degree of magnetic orientation of a sintered body obtained after firing. For example, n in the general formula may: be 4 to 100, or 4 to 30. Examples of the polyhydric alcohol include sorbitol. In addition, two or more kinds of polyhydric alcohols may be used in combination. In addition, another known dispersant may be further used in addition to the polyhydric alcohol.

In the case of adding the polyhydric alcohol, an addition amount thereof may be, for example, 0.05% by mass to 5.0% by mass, or 0.1% by mass to 3.0% by mass with respect to an addition target (for example, a coarse powder). Note that, the polyhydric alcohol added in the fine pulverization process is thermally decomposed and removed in a firing process to be described later.

(Additive Powder Mixing Process)

Next, the ferrite powder and an additive powder are mixed to obtain a mixed powder.

The additive powder may be mixed to the pulverized ferrite powder obtained in the pulverization process, but it is preferable that the additive powder is added to the powder during the pulverization process, and mixing of the ferrite powder and the additive powder is performed simultaneously with pulverization of the calcined body.

The additive powder contains at least Co and La, and does not contain Fe. An atomic ratio of Co to La in the additive powder is set to 40% to 80% with respect to an atomic ratio of Co to La in the raw material powder, and Co/La ratio in the additive powder is set to be smaller in comparison to the raw material powder.

It is preferable that the additive powder further contain the metal element A. The kind of the metal element A may be the same as in the raw material powder, or may be different from the raw material powder.

It is preferable that an atomic ratio of the metal element A to La in the additive powder is 80% to 120% with respect to an atomic ratio of the metal element A to La in the raw material powder, that is, the atomic ratios are set to be approximately the same as each other.

The additive powder may contain at least one kind of metal element R selected from the group consisting of Bi and rare earth elements including Y, in addition to La.

The additive powder may contain at least one kind of metal element M selected from the group consisting of Mn, Mg, Ni, Cu, and Zn in addition to Co.

The additive powder does not contain Fe. Description of "Fe is not contained" represents that Fe is 100 atom ppm or less with respect to all metal atoms.

As an example of a composition of the additive powder, with respect to the amount of all metal elements, A is 10 to 20 at %, La is 25 to 70 at %, the sum of La and metal element R is 30 to 75 at %. Co is 15 to 42 at %, and the sum of Co and the metal element M is 15 to 45 at %.

The amount of the additive powder is preferably set to 0.1% by mass to 7% by mass with respect to the mass of the ferrite powder. The mass of the metal element La in the additive powder can be 0.05% to 5% of the mass of La in the raw material powder, and the mass of the metal element R in the additive powder may be 0.05% to 6% of the mass of the metal element R in the raw material powder.

In the case of performing pulverization of the calcined body in two steps, the additive powder may be added either before or after the coarse pulverization process, or the additive powder may be divided into two parts and may be added before and after the coarse pulverization, respectively.

(Molding Process)

In the molding process, the mixed powder obtained in the additive powder mixing process (for example, the pulverization process) is molded in a magnetic field to obtain a molded body. The molding can be performed by either dry molding or wet molding. From the viewpoint of raising the degree of magnetic orientation, the molding is preferably performed by the wet molding.

In the case of performing the molding by the wet molding, for example, the above-described fine pulverization process is performed in a wet type to obtain slurry, and the slurry is concentrated to a predetermined concentration to obtain slurry for wet molding. Molding can be performed by using the slurry for wet molding, Concentration of the slurry can be performed by centrifugation, filter press, or the like. The content of the ferrite particles in the slurry for wet molding is, for example, 30% by mass to 80% by mass. Examples of a dispersion medium of dispersing ferrite particles in the slurry include water. A surfactant such as gluconic acid, gluconate, and sorbitol may be added to the slurry. As the dispersion medium, a nonaqueous solvent can be used. As the nonaqueous solvent, an organic solvent such as toluene and xylene can be used. In this case, a surfactant such as oleic acid may be added. Note that, the slurry for wet molding may be prepared by adding a dispersion medium or the like to ferrite particles in a dry state after fine pulverization.

In the wet molding, the slurry for the wet molding is then subjected to molding in a magnetic field. In this case, a molding pressure is, for example, 9.8 to 196 MPa (0.1 to 2.0 ton/cm$^3$). For example, an applied magnet field is 398 to 1194 kA/m (5 to 15 kOe).

(Firing Process)

In a firing (main firing) process, the molded body obtained in the molding process is fired to obtain a ferrite sintered magnet, Firing of the molded body can be performed in an oxidizing atmosphere such as in the air. For example, a firing temperature may be 1050° C. to 1300° C., or 1080° C. to 1290° C. In addition, firing time (time to maintain the firing temperature) is, for example, 0.5 to 3 hours.

In the firing process, before reaching a sintering temperature, for example, heating may be performed from room temperature to approximately 100° C. at a temperature rising rate of approximately 0.5° C./minute. According to this, the molded body can be sufficiently dried before sintering proceeds. In addition, the surfactant added in the molding process can be sufficiently removed. Note that, the processes may be performed at the beginning of the firing process, or may be separately performed before the firing process.

In this manner, the ferrite sintered magnet can be manufactured.

In addition, for example, the molding process and the firing process may be performed in the following procedure. That is, the molding process may be performed by a ceramic injection molding (CIM) method or powder injection molding (PIM), in the CIM method, first, a mixed powder that is dried is heated and kneaded in combination with a binder resin to form pellets. The pellets are injection-molded in a mold to which a magnetic field is applied to obtain a preliminary molded body. The binder is removed from the preliminary molded body to obtain a molded body. Next, in the firing process, the molded body from which the binder has been removed is sintered, for example, in the air, preferably at a temperature of 1100° C. to 1300° C., and more preferably at a temperature of 1160° C. to 1290° C. for approximately 0.2 to 3 hours to obtain a ferrite sintered magnet.

EXAMPLES

The contents of the embodiment will be described in more detail with reference to examples and comparative examples, but the invention is not limited to the following examples.

Comparative Example 1

As a raw material, powders of barium carbonate ($BaCO_3$), calcium carbonate ($CaCO_3$), strontium carbonate ($SrCO_3$), lanthanum hydroxide ($La(OH)_3$), iron oxide ($Fe_2O_3$), and cobalt oxide ($Co_3O_4$) were prepared.

The raw material powders were blended so that metal atom ratios become a metal composition shown in Table 1. Mixing and pulverization were performed by using a wet attritor and a ball mill to obtain slurry (blending process). After drying slurry and removing coarse particles, calcination was performed in the air at 1310° C. to obtain a calcined powder (calcination process).

TABLE 1

| | Metal composition of raw material powder (atomic ratio) | | | | | | | |
|---|---|---|---|---|---|---|---|---|
| | A | | | R | | M | Sum of | |
| | Ca | Ba | Sr | La | Fe | Co | metals | Co/La |
| Examples 1 to 9 Comparative Examples 1 to 3 | 0.2 | 0.05 | 0 | 0.75 | 10.95 | 0.35 | 12.3 | 0.47 |
| Example 10 | 0 | 0.25 | 0 | 0.75 | 10.95 | 0.35 | 12.3 | 0.47 |
| Example 11 | 0 | 0 | 0.25 | 0.75 | 10.95 | 0.35 | 12.3 | 0.47 |
| Example 12 | 0.25 | 0 | 0 | 0.75 | 10.95 | 0.35 | 12.3 | 0.47 |

The obtained calcined powder was coarsely pulverized with a small-sized rod vibration mill to obtain a coarse powder (coarse pulverization process).

Raw material powders were blended to be a metal composition as shown in Table 2 to obtain an additive powder. After additive powder was added to the coarse powder to be 1.0% with respect to the mass of the coarse powder, the resultant mixed powder was finely pulverized by using a wet ball mill to obtain shiny containing ferrite particles (pulverization and additive powder mixing process).

2, that is, the Co/La ratio was decreased. The amount of the additive powder added to the coarse powder was set so that an absolute amount of the metal element A (Ca, Ba, or the like), and the metal element R (La) is not changed from Comparative Example 1.

Comparative Example 3

Comparative Example 3 was similar to Comparative Example 1 except that the additive powder was not added.

TABLE 2

| | Metal composition of additive powder (atomic ratio) | | | | | | | | Ratio of Co/La ratio in additive powder to Co/La ratio in raw | Post-addition amount |
|---|---|---|---|---|---|---|---|---|---|---|
| | A | | | R | | M | Sum of | | | |
| | Ca | Ba | Sr | La | Fe | Co | metals | Co/La | material powder (%) | (wt %) |
| Comparative Example 1 | 0.2 | 0.05 | 0 | 0.75 | 0 | 0.35 | 1.35 | 0.47 | 100.0 | 1.0 |
| Example 1 | 0.2 | 0.05 | 0 | 0.75 | 0 | 0.14 | 1.14 | 0.19 | 40.0 | 1.0 |
| Example 2 | 0.2 | 0.05 | 0 | 0.75 | 0 | 0.21 | 1.21 | 0.28 | 60.0 | 1.0 |
| Example 3 | 0.2 | 0.05 | 0 | 0.75 | 0 | 0.28 | 1.28 | 0.37 | 80.0 | 1.0 |
| Example 4 | 0 | 0 | 0 | 0.75 | 0 | 0.21 | 0.96 | 0.28 | 60.0 | 1.0 |
| Comparative Example 2 | 0.2 | 0.05 | 0 | 0.75 | 0 | 0.07 | 1.07 | 0.093 | 20.0 | 1.0 |
| Comparative Example 3 | — | — | — | — | — | — | — | — | — | 0 |
| Example 5 | 0.2 | 0.05 | 0 | 0.75 | 0 | 0.21 | 1.21 | 0.28 | 60.0 | 0.1 |
| Example 6 | 0.2 | 0.05 | 0 | 0.75 | 0 | 0.21 | 1.21 | 0.28 | 60.0 | 0.5 |
| Example 7 | 0.2 | 0.05 | 0 | 0.75 | 0 | 0.21 | 1.21 | 0.28 | 60.0 | 2.0 |
| Example 8 | 0.2 | 0.05 | 0 | 0.75 | 0 | 0.21 | 1.21 | 0.28 | 60.0 | 5.0 |
| Example 9 | 0.2 | 0.05 | 0 | 0.75 | 0 | 0.21 | 1.21 | 0.28 | 60.0 | 7.0 |
| Example 10 | 0 | 0.25 | 0 | 0.75 | 0 | 0.21 | 1.21 | 0.28 | 60.0 | 1.0 |
| Example 11 | 0 | 0 | 0.25 | 0.75 | 0 | 0.21 | 1.21 | 0.28 | 60.0 | 1.0 |
| Example 12 | 0.25 | 0 | 0 | 0.75 | 0 | 0.21 | 1.21 | 0.28 | 60.0 | 1.0 |

The amount of moisture in the slurry obtained after the fine pulverization was adjusted to obtain slurry for wet molding. The slurry for wet molding was molded by using a wet magnetic field molding machine in an application magnetic field of 796 kA/m (10 kOe) to obtain a molded body having a circular columnar shape of 30 mm (diameter)×15 mm (thickness) (molding process).

The obtained molded body was dried in the air at room temperature, and was subsequently fired in the air at 1280° C. (firing (main firing) process).

In this manner, a ferrite sintered magnet having a circular columnar shape was obtained.

Examples 1 to 4, and Comparative Example 2

Examples 1 to 4 and Comparative Example 2 were similar to Comparative Example 1 except that the metal composition in the additive powder was changed as shown in Table 2, that is, the Co/La ratio was decreased.

Examples 5 to 9

Examples 5 to 9 were similar to Example 2 except that the addition amount (mass) of the additive powder was set to 0.1 times, 0.5 times, two times, five times, and seven times, respectively.

Examples 10 to 12

Examples 10 to 12 were similar to Example 2 except that the composition of the raw material powder was changed as shown in Table 1, and the composition of the additive powder was set as shown in Table 2.

<Evaluation of Magnetic Characteristics>

Upper and lower surfaces of the ferrite sintered magnet were processed, and then Br and HcJ at 20° C. were respectively measured by using a B-H tracer in which a maximum application magnetic field is 29 kOe.

<Evaluation of Cutting Speed>

A corner of the sintered magnet was cut out by using low-speed accurate cutter ISOMET manufactured by BUEHLER. Specifically, a rectangular parallelepiped-shaped sintered magnet having a size of 10×10×20 mm applied with a weight of 26.3 g was placed on an upper edge of a disc blade rotating on the horizontal axis, in a state in which a long axis direction of the rectangular parallelepiped shape is horizontal, an edge formed between side surfaces of the rectangular parallelepiped shape is at the lowest position, and a direction of the edge of the rectangular parallelepiped shape and the horizontal axis of the disc blade become parallel, and the state was maintained for 30 seconds or 60 seconds. After passage of a predetermined time, the sintered magnet was detached from the disc blade, and a depth cut out by the disc blade in the sintered magnet was measured. A cutting speed was obtained by cutting depth (mm)/time (min).

Measurement was performed respectively with respect to two opposite edges of the sintered magnet having the rectangular parallelepiped shape, and an arithmetic mean was obtained.

<Composition Analysis>

Ion polishing was performed by a focused ion beam (FIB) method using a focused ion beam device to obtain a thin piece having a thickness of 100 nm from the ferrite sintered magnet With respect to the thin piece, linear analysis of elements was performed by using STEM-EDS from a ferrite crystal grain on one side to a ferrite crystal grain on the other side vertically across a grain boundary phase to measure a concentration variation along a line of a metal element. A measurement interval was set to 3 nm, a metal element concentration of a grain boundary and a metal element concentration of a ferrite crystal grain were obtained for each grain boundary. The metal element concentration of the ferrite crystal grain was set as an arithmetic mean of three points spaced apart from the grain boundary by 7 nm or greater in each of the ferrite particle on one side and the ferrite particle on the other side. The above-described measurement was performed at five grain boundaries and averaging was performed to obtain a metal element concentration of the grain boundary phase and the ferrite crystal grains.

Composition analysis results in the sintered magnet of Example 1 are shown in Table 3.

TABLE 3

| | Atomic concentration C with respect to all metal elements (at %) | | | | | R = $C_{Co}$/ | $R_{GB}$/ | $C_{Co,\,GB}$/ |
|---|---|---|---|---|---|---|---|---|
| | Ca | Ba | La | Fe | Co | $C_{La}$ | $R_{FG}$ | $C_{Co,\,FG}$ |
| Ferrite crystal grain (FG) | 2.0 | 1.0 | 7.1 | 87.5 | 2.4 | 0.34 | 0.51 | 0.58 |
| Grain boundary (GB) | 4.8 | 0.9 | 8.2 | 84.7 | 1.4 | 0.17 | | |

Measurement results in respective examples and comparative examples are shown in Table 4. Comparative Example 2, cracks occurred in the sintered magnet, and evaluation was difficult.

TABLE 4

| | $R_{GB}$/ $R_{FG}$ | $C_{Co,GB}$/ $C_{Co,FG}$ | Cutting speed (mm/min) | Br (G) | Hcj (Oe) |
|---|---|---|---|---|---|
| Comparative Example 1 | 0.94 | 0.94 | 0.9 | 4690 | 2320 |
| Example 1 | 0.51 | 0.58 | 1.5 | 4640 | 2340 |
| Example 2 | 0.62 | 0.72 | 1.4 | 4670 | 2380 |
| Example 3 | 0.90 | 0.79 | 1.2 | 4680 | 2370 |
| Example 4 | 0.62 | 0.72 | 1.3 | 4590 | 2390 |
| Comparative Example 2 | 0.32 | 0.46 | — | — | — |
| Comparative Example 3 | 0.92 | 0.21 | 1.0 | 4690 | 2290 |
| Example 5 | 0.62 | 0.42 | 1.1 | 4690 | 2370 |
| Example 6 | 0.63 | 0.65 | 1.2 | 4680 | 2380 |
| Example 7 | 0.62 | 0.80 | 1.4 | 4660 | 2390 |
| Example 8 | 0.61 | 0.92 | 1.5 | 4620 | 2420 |
| Example 9 | 0.61 | 0.98 | 1.5 | 4610 | 2440 |
| Example 10 | 0.61 | 0.63 | 1.3 | 4670 | 2370 |
| Example 11 | 0.63 | 0.62 | 1.4 | 4679 | 2374 |
| Example 12 | 0.62 | 0.61 | 1.3 | 4682 | 2380 |

A cutting speed of the sintered magnet was preferably 1.1 min/min or greater. Br is preferably 4600 G or greater. Hcj is preferably 2200 Oe or greater.

In examples satisfying $R_{GB}/R_{FG}$ in a specific range, it was confirmed that the cutting speed is high. In addition, it was also confirmed that as $C_{Co,\,GB}/C_{Co,\,FG}$ is lower, Br is further improved. In Examples 8 and 9 in which $C_{Co,\,GB}/C_{Co,\,FG}$ is high, a different phase (for example, $LaFeO_3$) was confirmed.

REFERENCE SIGNS LIST

4: Ferrite crystal grain

6: Grain boundary phase

What is claimed is:

1. A ferrite sintered magnet, comprising:

magnetoplumbite type ferrite crystal grains; and a grain boundary phase interposed between the ferrite crystal grains, wherein the ferrite crystal grains and the grain boundary phase respectively contain a metal element A, La, Co, and Fe, the metal element A is at least one kind of element selected from the group consisting of Sr, Ba, and Ca, and when an atomic ratio of Co to La in the ferrite crystal grains is set as $R_{FG}$, and an atomic ratio of Co to La in the grain boundary phase is set as $R_{GB}$, the following expression is satisfied;

$$0.5 \le R_{GB}/R_{FG} \le 0.9, \text{ and}$$

wherein when an atomic ratio of Co in all metal atoms of the ferrite crystal grains is set as $C_{Co,\,FG}$, and an atomic ratio of Co in all metal atoms of the grain boundary phase is set as $C_{Co,\,GB}$, the following expression is satisfied:

$$0.5 < C_{Co,GB}/C_{Co,FG} < 1.$$

2. The ferrite sintered magnet according to claim 1, wherein, with respect to an atomic ratio of all metal elements of the grain boundary phase, a ratio of the metal element A is 1 to 14 at %.

3. The ferrite sintered magnet according to claim 1, wherein an atomic ratio of La in all metal atoms of the grain boundary phase is greater than an atomic ratio of La in all metal atoms of the ferrite crystal grains.

* * * * *